United States Patent
Bui et al.

(10) Patent No.: US 9,564,160 B1
(45) Date of Patent: Feb. 7, 2017

(54) SERVO COMPENSATION CONTROL IN A VIBRATION ENVIRONMENT

(71) Applicant: INTERNATIONAL BUSINESS MACHINES CORPORATION, Armonk, NY (US)

(72) Inventors: Nhan X. Bui, Tucson, AZ (US); Angeliki Pantazi, Thalwil (CH); Tomoko Taketomi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/808,153

(22) Filed: Jul. 24, 2015

(51) Int. Cl.
- *G11B 5/584* (2006.01)
- *G11B 33/08* (2006.01)
- *G11B 5/008* (2006.01)

(52) U.S. Cl.
CPC .......... *G11B 5/584* (2013.01); *G11B 5/00813* (2013.01)

(58) Field of Classification Search
CPC ..... G11B 33/08; G11B 25/043; G11B 33/121; G11B 5/6005; G11B 5/59655; G11B 5/59633; G11B 15/48; G11B 15/1875; G11B 5/584; G11B 5/5504; G11B 5/5508; G11B 5/00813
USPC ............ 360/75, 70, 71, 77.02, 97.17, 78.02, 360/97.19, 97.12
See application file for complete search history.

(56) References Cited

U.S. PATENT DOCUMENTS

| | | | |
|---|---|---|---|
| 7,016,138 B2 * | 3/2006 | Egan | G11B 15/43 360/71 |
| 7,145,307 B2 | 12/2006 | Hosono et al. | |
| 7,268,970 B2 * | 9/2007 | Anderson | G11B 5/584 360/60 |
| 8,665,552 B2 | 3/2014 | Fasen | |
| 8,699,174 B2 | 4/2014 | Kinney et al. | |
| 9,042,046 B2 | 5/2015 | Inch et al. | |
| 2003/0231423 A1 | 12/2003 | Semba et al. | |
| 2006/0176004 A1 | 8/2006 | Hosono et al. | |
| 2009/0128945 A1 | 5/2009 | Ding et al. | |
| 2013/0135764 A1 | 5/2013 | Dhanda et al. | |

FOREIGN PATENT DOCUMENTS

EP 1768111 A2 3/2007

OTHER PUBLICATIONS

Pannu et al., Adaptive Accelerometer Feedforward Servo for Disk Drives, 3 pages.

* cited by examiner

*Primary Examiner* — Nabil Hindi
(74) *Attorney, Agent, or Firm* — Griffiths & Seaton PLLC (57) ABSTRACT

Methods, systems, and computer program product embodiments for improving track-follow control in a tape storage system, by a processor device, are provided. In one embodiment, a method comprises, using an accelerometer to dynamically detect device vibration for determining whether to implement a vibration compensation control mechanism.

15 Claims, 7 Drawing Sheets

SERVO COMPENSATION CONTROL IN A VIBRATION ENVIRONMENT

BACKGROUND OF THE INVENTION

Field of the Invention

The present invention relates in general to computers, and more particularly to a method, system, and computer program product for servo vibration compensation control in tape storage systems.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE DESCRIBED EMBODIMENTS

Various embodiments for improving track-follow control in a tape storage system, by a processor device, are provided. In one embodiment, a method comprises, using an accelerometer to dynamically detect device vibration for determining whether to implement a vibration compensation control mechanism.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media. An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

Tape drives have conventionally used a servo system to keep the write/read heads in the correct lateral location on the tape. The difference between the correct location and actual location of the heads is referred to as position error signal (PES). Current servo systems implement a fixed threshold such that if the PES is larger than the threshold, the writing of the heads will be stopped to prevent overwriting of adjacent tracks. This threshold is referred to as the stopwrite (SW) threshold. However, it is difficult to pick the appropriate SW threshold due to the differences in distributions of PES data for different drives and/or different tapes. Another drawback is that when a particular predetermined SW threshold is used, the drive may write the data without any apparent error, when actually the adjacent tracks have been overwritten, rendering the data therein unreadable. This result is highly undesirable.

The required capacity scaling of future tape systems is likely to be achieved primarily through aggressive track density scaling. To achieve such required track densities, significant improvements must be made in the area of ultra-precise positioning of the recording head over the data tracks. Accordingly, the performance of track-follow mechanisms of tape drives must be dramatically improved. As eluded to previously, the basic functionality of track-follow control mechanisms are to reduce the misalignment between the tape and the recording head created by lateral motion of the flexible medium. Lateral tape motion (LTM) arises primarily from imperfections in tape guide rollers and reels, such as run-outs, eccentricities and other tape path imperfections.

Complicating the already challenging task of precisely positioning the recording head over increasingly smaller data tracks occurs when vibration is introduced into the storage environment. In a vibration environment, a track following servo for positioning the recorder head must perform and function even more precisely to cope with the vibratory forces exerted upon the track following mechanisms.

By increasing track-following gain at vibration frequencies, the effects of external vibratory forces can be partially mitigated. This higher gain at vibration frequencies, however, cannot be used in normal non-vibration environment conditions as it would cause servo overshoot issues impeding the performance of the track-follow mechanism under normal conditions. Thus requiring a need to switch a servo vibration compensation control mechanism on or off depending upon whether the tape drive is operating in a vibratory or non-vibratory environment.

Accordingly, in view of the foregoing, the present invention provides embodiments for implementing a servo vibration compensation control mechanism for improved tape storage performance while in operation in a vibratory environment.

Figure 1A:
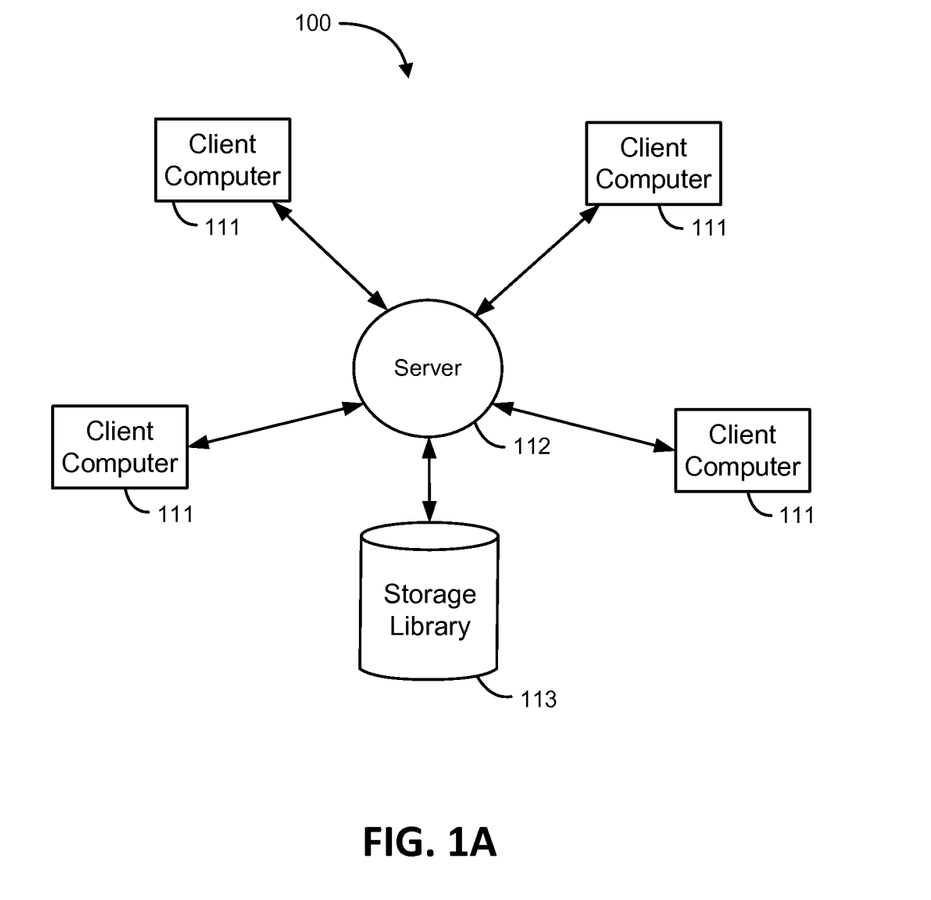
FIG. 1A is a block diagram illustrating a typical client-server library system for archiving data in which aspects of the invention can be implemented.

Turning now to the Figures, and in particular to FIG. 1A, there is depicted a block diagram of client-server library system 100 for archiving data in which aspects of the present invention may be implemented. The system 100 includes multiple client computers 111 from which data is transmitted to a server 112 for archiving in a data storage library 113. The client computers 111 also retrieve previously archived data from the library 113 through the server 112. Client computers 111 may be personal computers, portable devices (e.g., PDAs), workstations, or server systems, such as the IBM TS7720™. The client computers 111 may be connected to the server 112 through a local area network such as an Ethernet network, or by SCSI, iSCSI, Fibre Channel, Fibre Channel over Ethernet, or Infiniband. Server 112 may again be an IBM TS7740™ server, TS7720™ server, or other servers. Similarly, the data storage library 113 may be connected to the server 112 using a high data rate connection such as an optical or copper fiber channel, SCSI, iSCSI, Ethernet, Fibre Channel over Ethernet or Infiniband.

Figure 1B:
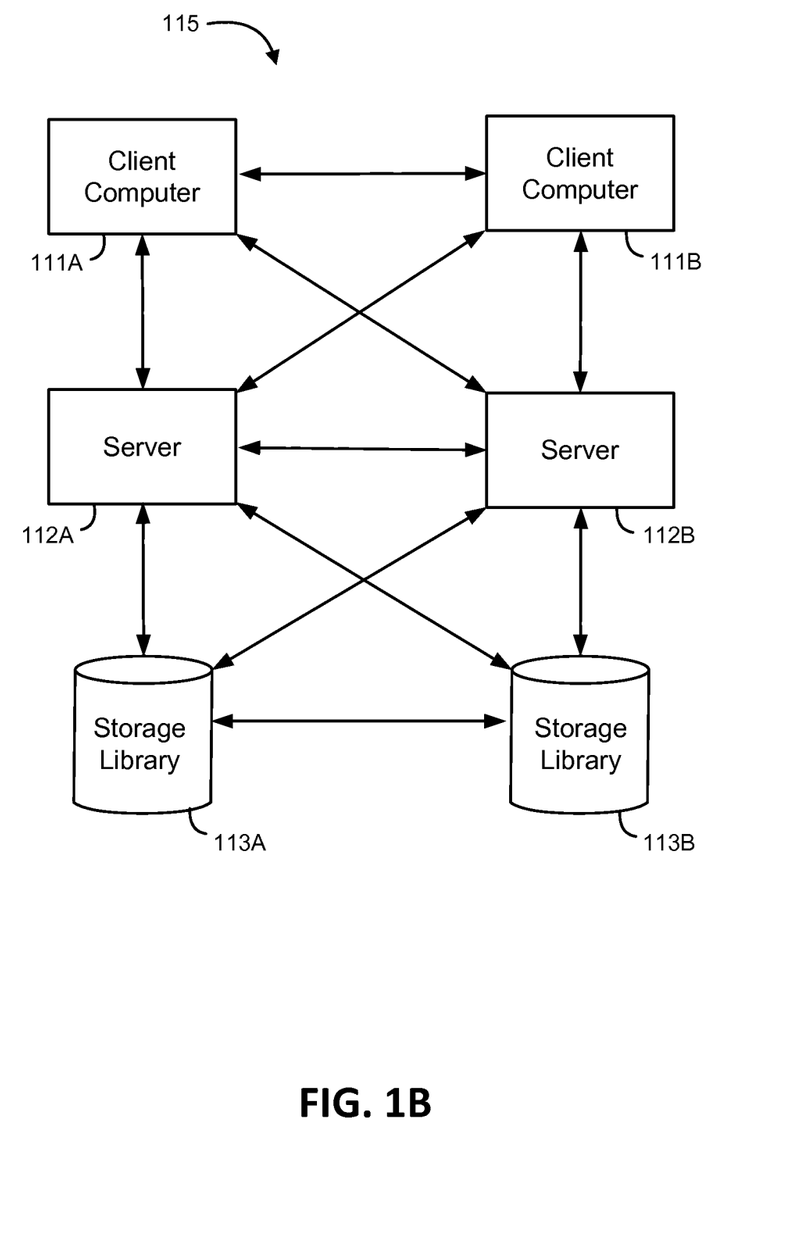
FIG. 1B is a block diagram illustrating a typical grid computing client-server library environment for archiving data in which aspects of the invention can be implemented.

FIG. 1B illustrates a block diagram of a typical grid computing library environment 115 for archiving data. The library environment 115 includes multiple client computers 111A and 111B interconnected to one another and to multiple server systems 112A and 112B. The server systems 112A and 112B are interconnected to one another and to multiple tape libraries 113A and 113B, which are also interconnected to one another.

Figure 2:
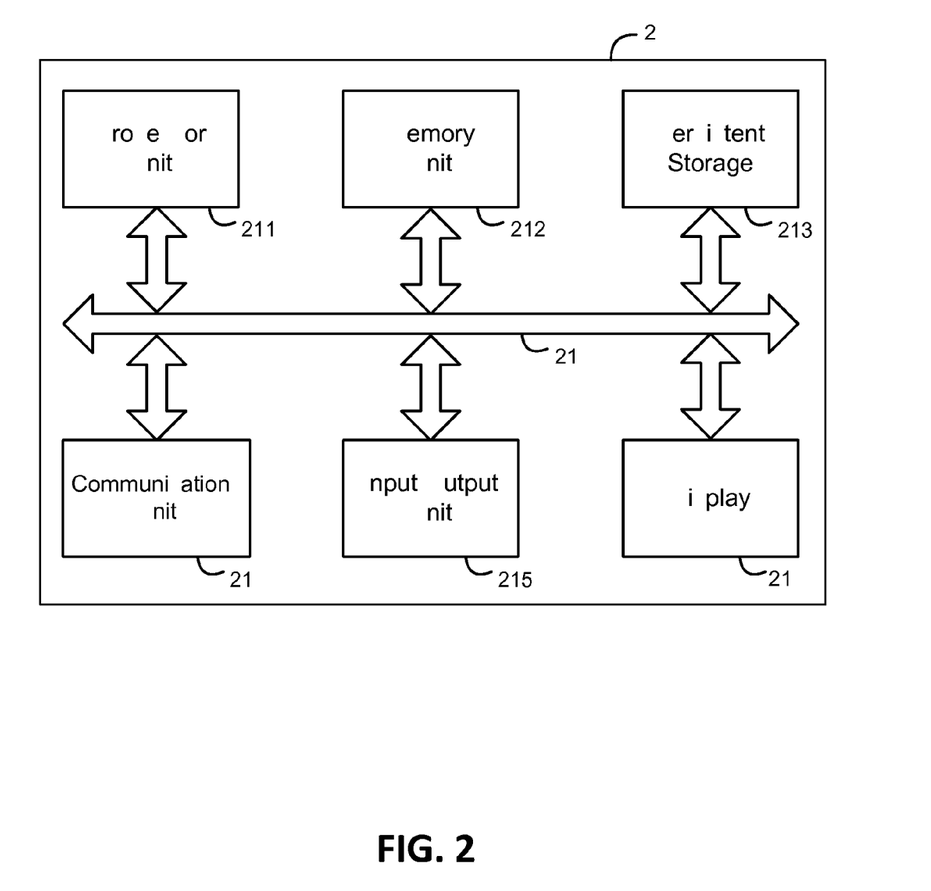
FIG. 2 is a block diagram illustrating a representative computer system which may be used as a client or a server computer.

FIG. 2 illustrates a block diagram of a data processing system that may be used as a client computer 111 or server system 112. As shown, a data processing system 200 includes a processor unit 211, a memory unit 212, a persistent storage 213, a communications unit 214, an input/output unit 215, a display 216 and a system bus 210. Computer programs are typically stored in the persistent storage 213 until they are needed for execution, at which time the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

Figure 3:
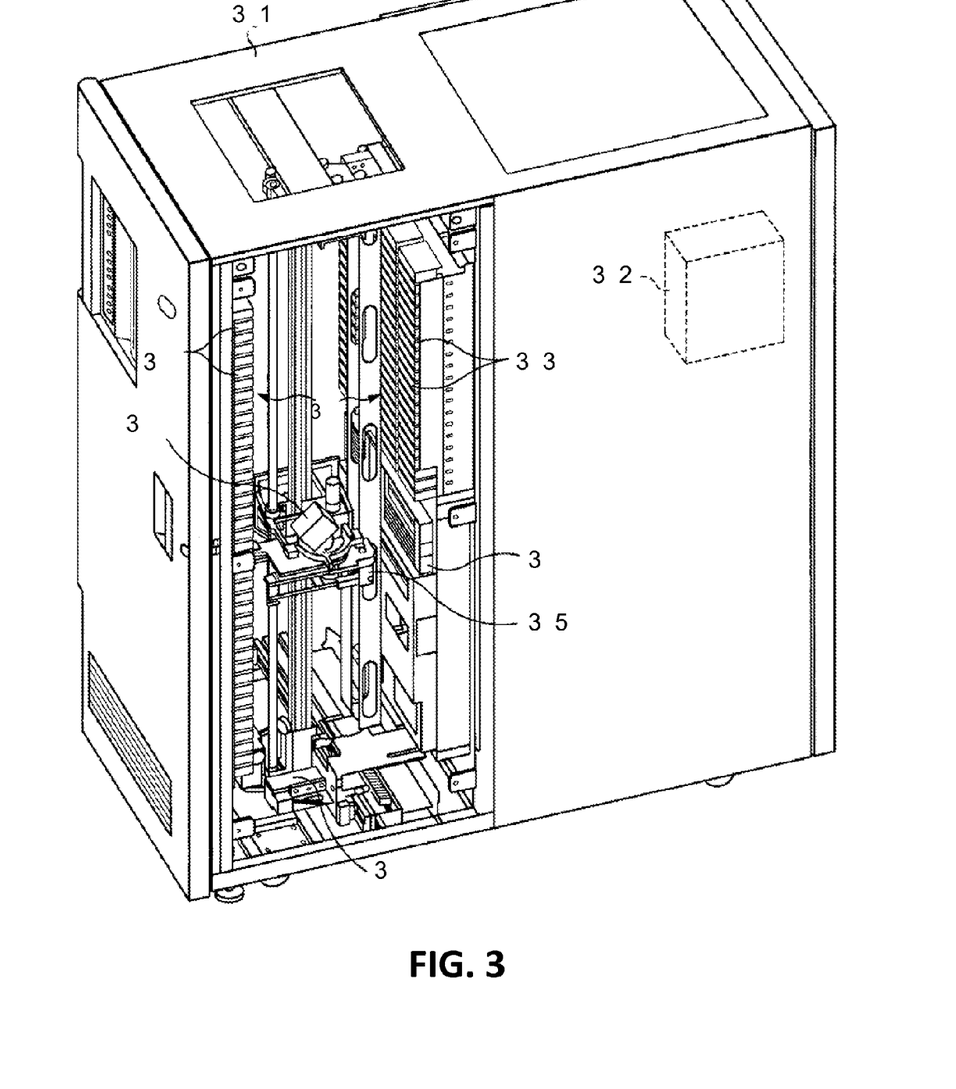
FIG. 3 illustrates a typical data storage tape library for archiving data in which aspects of the present invention may be implemented upon.

FIG. 3 illustrates an example of a data storage library 301 which may be found in an environment of an implementation of the present invention. The library 301 is an automated tape library that accommodates multiple tape drives 304 for reading and writing on tape media, such as single-reel or two-reel magnetic tape cartridges. Examples of the library 301 include IBM TS3400™ and TS3500™ Tape Libraries, IBM TotalStorage™ 3494 Tape Libraries, and IBM 3952™ Tape Frames Model C20, which store magnetic tape cartridges and use IBM TS1130™ tape drives. Other examples of the library 301 include IBM TS3310™ and TS3100/3200™ tape libraries which store magnetic tape cartridges and use IBM LTO (Linear Tape Open) tape drives. A plurality of tape media 303 are stored in banks or groups of storage slots 309. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. An access robot 306, including a cartridge picker 305 and a bar code reader 308 mounted on the picker, transports a selected cartridge 303 between a storage slot 309 and a drive 304.

The library 301 further has a library controller 302 which includes at least one microprocessor. The library controller 302 may serve to provide an inventory of the cartridges 303 and to control the library 301. Typically, the library controller 302 has suitable memory and data storage capability to control the operation of the library 301. The library controller 302 controls the actions of the access robot 306, cartridge picker 305, and bar code reader 308. The library controller 302 is interconnected through an interface to one or more host processors, which provides commands requesting access to particular tape media or to media in particular storage slots. A host, either directly, or through the library controller, controls the actions of the data storage drives 304. Commands for accessing data or locations on the tape media and information to be recorded on, or to be read from, selected tape media are transmitted between the drives 304 and the host. The library controller 302 is typically provided with a database for locating the tape cartridges 303 in the appropriate storage slots 309 and for maintaining the cartridge inventory.

Figure 4:
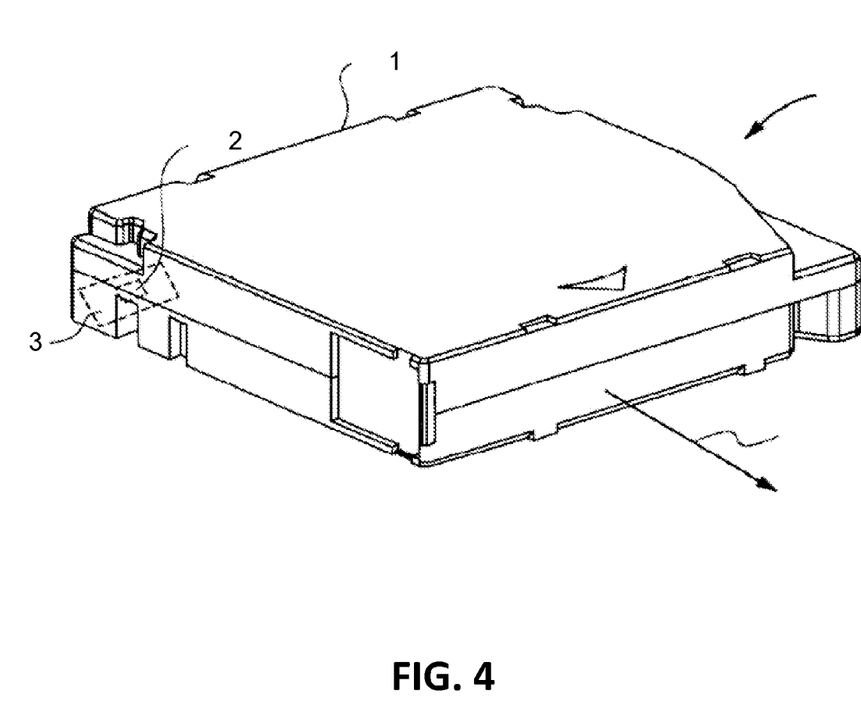
FIG. 4 illustrates an example of a tape cartridge media for use in the data storage tape library in FIG. 3.

FIG. 4 illustrates a perspective view of an exemplary tape cartridge 400 for use in a tape drive system 304 of FIG. 3, and fundamental to the present invention. The tape cartridge 400 has a reel (not shown) for holding tape media (not shown) which is wound around the reel hub. The tape cartridge 400 further includes an RFID cartridge memory 402 which is on printed circuit board 403, for wireless interfacing with the tape drive 304 and the cartridge picker 305. The tape cartridge 400 is referred to as a single-reel cartridge as it includes only one tape reel which acts as a supply reel during operation. A take-up reel is provided in the tape drive 304 for receiving the tape media when the tape media is being unspooled from the tape reel. In a different design of the tape drive 304, a take-up reel might be included in the cartridge 400 itself rather than in the tape drive 304. Such a tape cartridge is referred to as a dual-reel cartridge. Cartridge 400 is inserted along direction 404 into tape drive 304.

Figure 5:
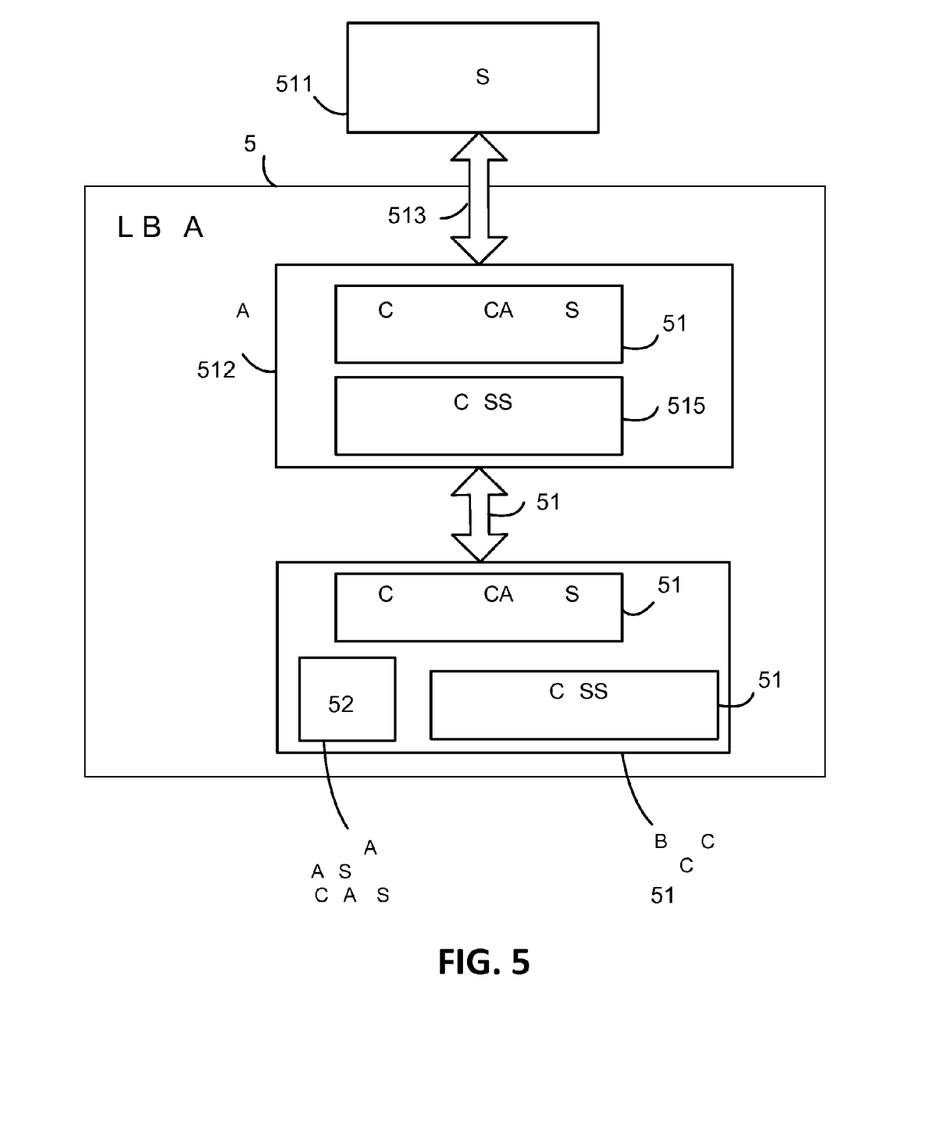
FIG. 5 illustrates a block diagram showing an exemplary data storage tape library in communication with a host computer for providing aspects of the invention.

FIG. 5 is a block diagram showing the functional components of an exemplary data storage tape library 500 in communication with a host computer 511 for providing aspects of the invention. The library 500 is attached to a host 511, and includes a media drive 512 and a robotic device 517. Data and control path 513 interconnects the host 511 and drive 512. Similarly, data and control path 516 interconnects the drive 512 and the robotic device 517. The paths 513 and 516 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 513 and 516 may employ serial, parallel, or another communications format, using digital or analog signals as desired. Communications with the media drive 512 and robotic device 517 are through communications ports 514 and 518, respectively.

Both the drive 512 and the robotic device 517 include respective processing units 515 and 519. The library 500 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 511 may be a server, workstation, personal computer, or other means for exchanging data and control signals with the media drive 512. The drive 512 comprises a machine for reading data from and/or writing data to exchanging data with a portable data storage media. The robotic device 517 includes the processing unit 519 and a media transport mechanism 520 coupled to processing unit 519. The media transport mechanism 520 includes servos, motors, arms, grippers, sensors and other robotic, mechanical and electrical equipment to perform functions that include (at least) the transportation of media items between the drive 512, various storage bins (not shown), import/export slots, etc. The mechanism 520 may, for example, comprise an auto-loader mounted to the drive 512, a robotic arm housed inside a mass storage library, or another suitable device. As an example, the mechanism 520 may comprise an access robot 306, cartridge picker 305 and bar code reader 308 from FIG. 3.

Figure 6:
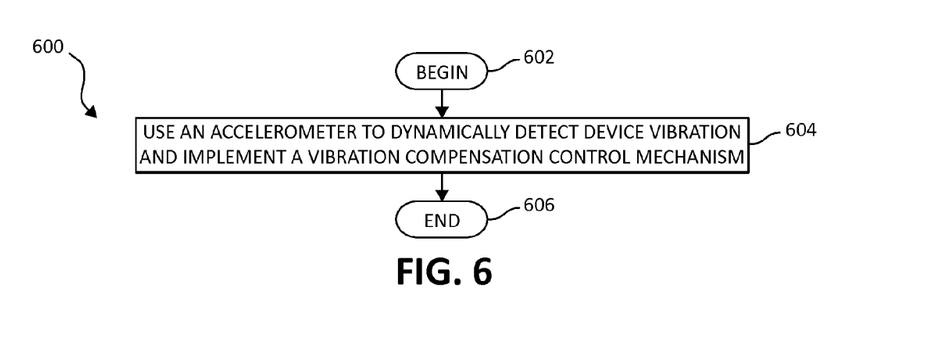
FIG. 6 illustrates flow chart of a method for improving track-follow performance within a tape storage device.

FIG. 6 illustrates a flow chart of a method 600 for improving track-follow performance within a tape storage device. Beginning at step 602, an accelerometer is used within the storage tape controller to dynamically detect device vibration, for determining whether to implement a vibration compensation control mechanism (step 604). The method ends (step 606).

In one embodiment, the accelerometer is installed on a main control board within a tape controller. The accelerometer senses tape drive acceleration and vibratory forces exerted on the drive, and outputs a signal directly proportional to the intensity of vibratory forces the drive is under subjection to. This allows for vibration detection, and a vibration compensation control mechanism to be implemented within the drive before actual operation, which significantly improves drive performance.

A raw accelerometer output signal is unusable to activate as a switching mechanism alone, as the output signal is reflecting positive and negative vibratory force values as a result of the accelerometer moving in response to vibrations. Instead, in one embodiment, the absolute value of the signal output of the accelerometer is used to determine only positive values. The signal is then inputted into a low-pass filter in which only low frequency signals may be observed. The low-pass filtered signal may then be used as a threshold value for determining whether to activate a servo vibration compensation control mechanism, thus increasing track-following gain at vibration frequencies to mitigate vibratory force effect on the tape storage drive.

Figure 7:
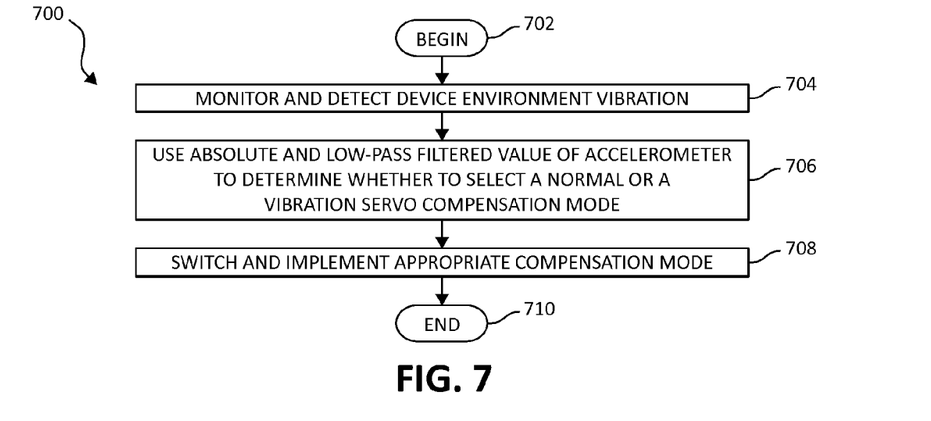
FIG. 7 illustrates an additional flow chart of a method for improving track-follow performance within a tape storage device.

FIG. 7 illustrates an additional flow chart of a method 700 for improving track-follow performance within a tape storage device. Beginning at step 702, an accelerometer is installed on a tape controller board and used to monitor and detect vibratory forces exerted on the device (step 704). The absolute value of the output signal of the accelerometer is inputted into a low-pass filter, the output of which is compared to a threshold value for determining whether to operate the device in a normal mode, or switch into operation a vibratory compensation mode (step 706). Based upon the output value being compared to a predetermined threshold value, the tape storage device is operated in either the normal mode, or the vibratory compensation mode in which a vibration compensation control mechanism is implemented into a track-follow servo for controlling a read/recording head (step 708). The method ends (step 710).

Figure 8:
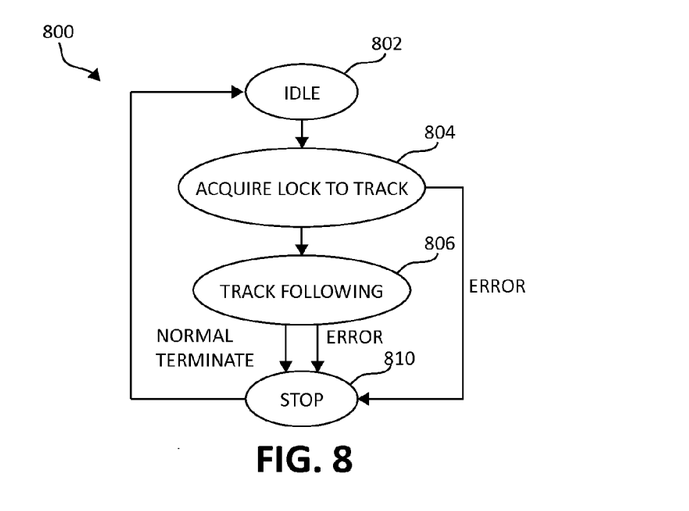
FIG. 8 illustrates a switching diagram of a tape controller vibration compensation control system featuring aspects of the present invention.

FIG. 8 is an illustration of a servo state 800 in which the aforementioned vibration compensation control mechanism is switched in operation. Between idle state 802 and an acquiring a lock to track state 804, the method 700 is used for determining whether to activate and implement a vibratory compensation operating mode or normal operating mode. The absolute, low-pass filtered value of the accelerometer is compared against a predetermined threshold value for determining a switch between a normal servo compensator or a vibration servo compensator. If an error occurs the process stops 810 and returns to an idle state 802. When a track lock is acquired, the servo enters a track-following state 806 using the normal servo compensator or vibration servo compensator as previously detected. Track-following state 806 may be stopped 810 by a normal terminate or an error. When stopped 810, the device returns to an idle state 802.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for improving tape storage track-follow control, by a processor device, comprising:
   in a tape storage device, using an accelerometer to dynamically detect device vibration for determining whether to implement a vibration compensation control mechanism;
   effectuating the vibration compensation control mechanism in the device by using one of a normal mode and a vibration mode; and influencing a track-following servo mechanism by using a signal output of the accelerometer to select operation under one of the normal mode and the vibration mode.

2. The method of claim 1, further including using an absolute value of the signal output of the accelerometer to select one of the normal mode and the vibration mode.

3. The method of claim 2, further including inputting the absolute value of the signal output of the accelerometer into a low pass filter.

4. The method of claim 3, further including using a value of an output signal of the low pass filter to determine whether to select one of the normal mode and the vibration mode; wherein if the output value is below a predetermined threshold the normal mode is selected, and if the output value is above the predetermined threshold the vibration mode is selected.

5. The method of claim 1, wherein the accelerometer is implemented into a tape controller device.

6. A system for improving tape storage track-follow control, comprising:
   at least one processor device, operable within a tape storage system, wherein the at least one processor device:
      uses an accelerometer to dynamically detect device vibration for determining whether to implement a vibration compensation control mechanism,
      effectuates the vibration compensation control mechanism in the device by using one of a normal mode and a vibration mode, and
      influences a track-following servo mechanism by using a signal output of the accelerometer to select operation under one of the normal mode and the vibration mode.

7. The system of claim 6, wherein the at least one processor device uses an absolute value of the signal output of the accelerometer to select one of the normal mode and the vibration mode.

8. The system of claim 7, wherein the at least one processor device inputs the absolute value of the signal output of the accelerometer into a low pass filter.

9. The system of claim 8, wherein the at least one processor device uses a value of an output signal of the low pass filter to determine whether to select one of the normal mode and the vibration mode; wherein if the output value is below a predetermined threshold the normal mode is selected, and if the output value is above the predetermined threshold the vibration mode is selected.

10. The system of claim 6, wherein the accelerometer is implemented into a tape controller device.

11. A computer program product for improving tape storage track-follow control within a tape controller device by at least one processor device operable within the tape controller device, the computer program product embodied on a non-transitory computer-readable storage medium having computer-readable program code portions stored therein, the computer-readable program code portions comprising:
    a first executable portion that uses an accelerometer to dynamically detect device vibration for determining whether to implement a vibration compensation control mechanism;
    a second executable portion that effectuates the vibration compensation control mechanism in the device by using one of a normal mode and a vibration mode; and
    a third executable portion that influences a track-follow servo mechanism by using a signal output of the accelerometer to select one of the normal mode and the vibration mode.

12. The computer program product of claim 11, further comprising a fourth executable portion that uses an absolute value of the signal output of the accelerometer to select operation under one of the normal mode and the vibration mode.

13. The computer program product of claim 12, further comprising a fifth executable portion that inputs the absolute value of the signal output of the accelerometer into a low pass filter.

14. The computer program product of claim 13, further comprising a sixth executable portion that uses a value of an output signal of the low pass filter to determine whether to select one of the normal mode and the vibration mode; wherein if the output value is below a predetermined threshold the normal mode is selected, and if the output value is above the predetermined threshold the vibration mode is selected.

15. The computer program product of claim 11, wherein the accelerometer is implemented into the tape controller device.

* * * * *